June 9, 1964 P. F. EVANS ETAL 3,136,912

METHOD FOR OBTAINING A CONDUCTOR PANEL

Filed July 18, 1960 2 Sheets-Sheet 1

PAUL F. EVANS
CARTER G. COOK
INVENTORS

BY Andrew L. Bain
Sal A. Giarratana
ATTORNEYS

PAUL F. EVANS
CARTER G. COOK
INVENTORS

BY Andrew L. Bain
S. A. Giarratana
ATTORNEYS

United States Patent Office 3,136,912

Patented June 9, 1964

3,136,912

METHOD FOR OBTAINING A CONDUCTOR PANEL

Paul F. Evans, Horseheads, N.Y., and Carter G. Cook, Scotch Plains, N.J., assignors to General Precision Inc., Little Falls, N.J., a corporation of Delaware Filed July 18, 1960, Ser. No. 43,410
1 Claim. (Cl. 313—108)

The present invention relates to a method and apparatus for obtaining a conductor panel and more particularly to a method and apparatus for obtaining a conductor panel having high resolution.

It is already known that conductor panels, such as used in the fabrication of electroluminescent coordinate panels, are readily obtainable with low resolution, and that panels with high resolution are difficult to construct, and if available are endowed with uncertain reliability. Hereinafter, the number of conductors per inch or packing density of a panel is defined as the resolution of the panel. A well-known method of fabricating a conductor panel utilizes the technique of vacuum deposition of a metal onto a substrate base with a mask means of sufficient resolution to divide the evaporated surface into lines. After depositing the metal lines, there still remained the problem of making suitable connection to these lines. In most cases, connection to the lines could only be made with rather complex means which reduced the overall application and efficiency of the conductor panels. In addition, the high cost of the vapor deposition equipment and the time consumed in the simple step of evacuating the working enclosure containing the panel make such devices costly and not susceptible to efficient high production techniques.

Present available conductor panels have the disadvantage that they seldom achieve the high resolution necessary and required by present electronic requirements, such as in the manufacture of electroluminescent coordinate panels with sufficiently high resolution for obtaining accurate and high speed results. For example, an electroluminescent coordinate panel apparatus constructed with high resolution conductor panels will have greater memory storage per unit volume and result in clearer images.

The present invention in its preferred form comprises a conductor panel having high resolution and fabricated by a method including the wrapping of the individual conductor filaments about a cylindrical member and forming a continuous integral helical coil. The coil is thereafter worked upon to expose the conductive surface of each filament to form a conductor panel composed of individual and parallel conductors.

An object of the present invention is the provision of a method and apparatus for obtaining a conductor panel with a high packing density wherein each conductor is insulated from one another and provided with panel connecting means integral with the assembly.

Another object is to provide a method and apparatus for obtaining a conductor panel having a high resolution.

A further object of the invention is the provision of a method and apparatus for obtaining a conductor panel wherein the packing density is limited only by the available conductive filament size.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figures 1, 2, 3, 4, 5, 6, 7:
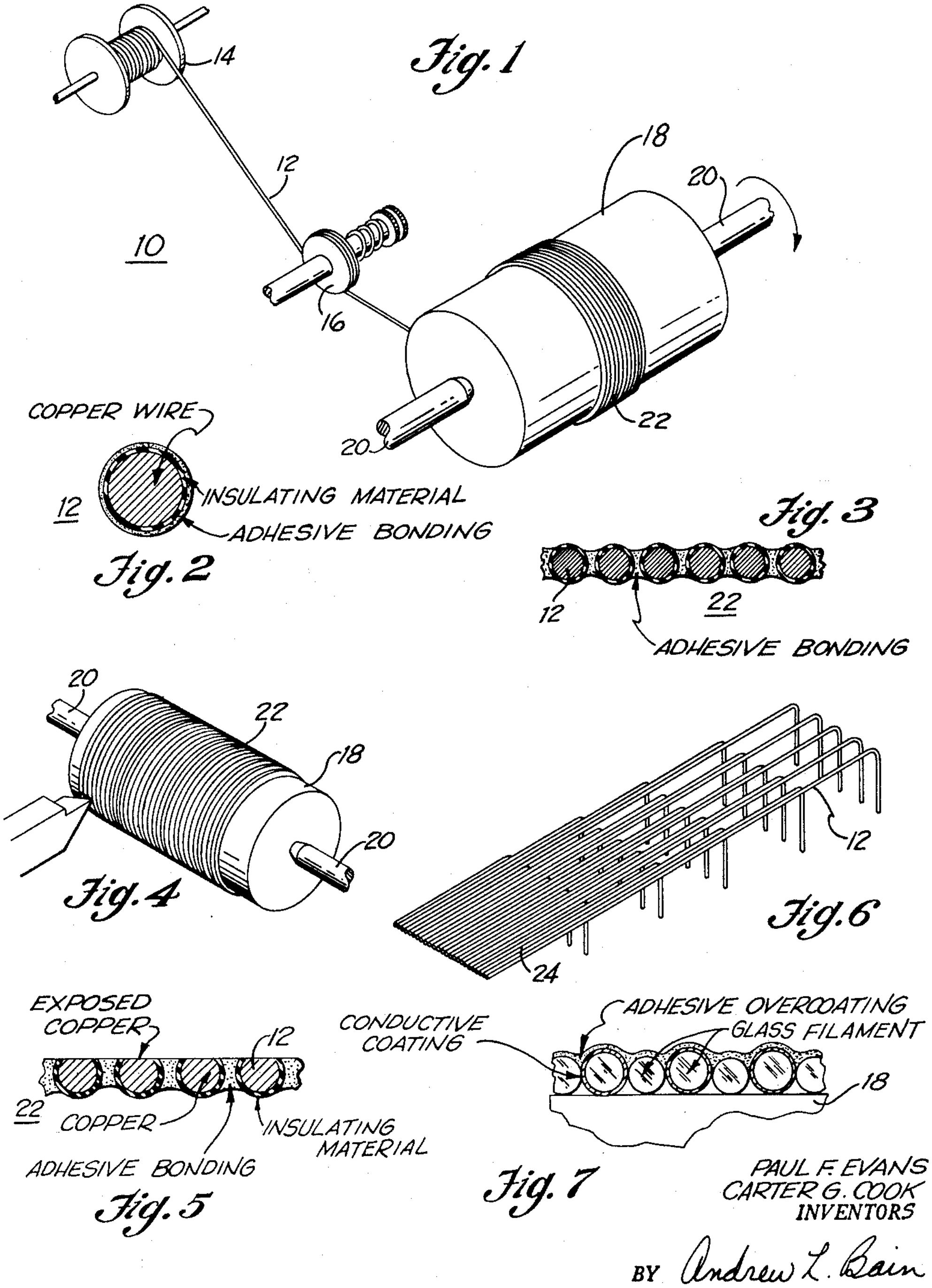
FIGURE 1 is a schematic view of a preferred embodiment of the apparatus used to form a continuous helical coil.
FIGURE 2 is a cross-sectional view of the conductive filament used in the apparatus of FIGURE 1.
FIGURE 3 is a cross-sectional view of the integral helical coil.
FIGURE 4 is a diagrammatic view showing the step of exposing the conductive surface of each filament.
FIGURE 5 is a cross-sectional view of the integral helical coil showing the exposed conductive surface of each filament.
FIGURE 6 is a perspective view of the conductor panel showing one end thereof separated to provide the integral panel connecting means.
FIGURE 7 is a cross-sectional view of a modification of the conductor panel made with the apparatus of FIGURE 1; and, FIGURE 8 is a perspective view of a coordinate conductor panel contemplated herein.
Figure 8:
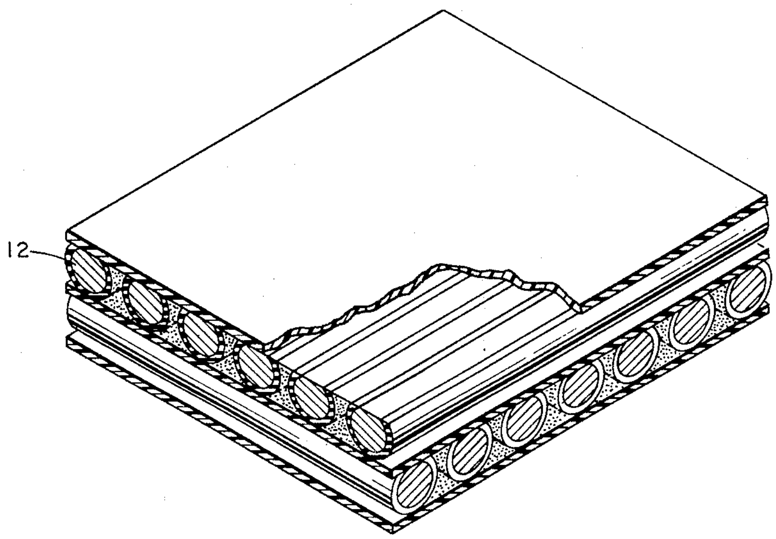

Referring now to the drawings, there is illustrated a preferred embodiment 10 of an apparatus used in the fabrication of a conductor panel, wherein a conductive filament 12 is fed from a supply spool 14 through a conventional tensioning device 16 to a mandrel 18. The mandrel is mounted between suitable centers 20 for rotation. The diameter of the mandrel utilized is a function of the size of conductor panel desired. The conventional tensioning device 16 supplies sufficient tension to the filament to uniformly wind them around the mandrel. The conductive filament 12, as shown in FIGURE 2, consists of a copper wire center with an insulation covering, such as insulating varnish, or the like, and with an outer coating of a suitable adhesive bonding material, such as a thermoplastic resin, or the like.

After a predetermined amount of conductive filament has been unreeled through the tensioning device onto the mandrel, the adhesive bonding on the insulated wire is softened with a suitable chemical, such as alcohol, and allowed to harden to provide a continuous integral helical coil 22, as seen from FIGURE 3. In the next step of the operation, a portion of the insulation is removed by a lathe bit, as shown in FIGURE 4, by grinding the surface, or by other suitable means which would expose the conductive surface of the individual filament without short-circuiting the filaments. If a grinding operation is used, a suitable etching process is employed to remove all loose metal particles to prevent short circuiting from one filament to another.

After the insulation has been removed from the surface of the integral coil to expose the copper for a predetermined portion of the wire diameter, a longitudinal cut is then made across the coil on the mandrel, and the integral coil of bonded conductive filaments is removed from the mandrel to form a conductor panel 24, as shown in FIGURE 6. The packing density of the conductor panel is limited only by the available filament size. For example, in the panel shown in FIGURE 6, the resolution is approximately 200 lines per inch utilizing 4.9 mil diameter wire. In like manner, with a one mil diameter wire, a conductor panel can be provided with a packing density of approximately a thousand lines per inch. It will be obvious that the packing density of a conductor panel fabricated in accordance with the present invention is limited only by the available filament size.

The conductor panels are integrally provided with connecting means by separating the individual filaments at one end into any desirable pattern. A preferred pattern is illustrated in FIGURE 6, but it will be obvious that any pattern can be utilized depending on the application of the conductor panel. The integral connecting facilities of the conductor panel eliminates the necessity of resorting to complex and expensive techniques to provide terminals for the individual filaments.

In the application of the conductor panel shown in FIGURE 6 to the fabrication of an electroluminescent coordinate panel, the panel is cemented to an appropriate insulating substrate, such as glass, plastic board, or the like, with the conductive surface exposed. Next, phosphor dispersed in a suitable dielectric, such as epoxy resin, is applied to the exposed copper surface of the panel as a thin film with a thickness depending on the type of phosphor and the operating voltage. Next, assuming that the conductor panel represents the $x$ coordinate, a $y$ coordinate panel composed of a plurality of transparent conductive filaments, fabricated in substantially the same manner as the conductor panel, is superimposed on the panel 24 in the $y$ direction.

As shown in FIGURE 7, the transparent conductor panel 26 is fabricated from a glass filament upon which is deposited a transparent coating of conductive salts, such as tin cloride, tin oxides, or the like. Such types of conductive salts are readily available on the commercial market. Since the glass filaments are coated with a transparent conductive material, insulation between the transparent conductors is provided by winding, in the apparatus shown in FIGURE 1, a conductive filament with a non-conductive filament in parallel. Hence, a conductive coated glass filament is fed from the supply spool 14 with a non-conductive glass filament adjacent thereto through the tensioning device 16 onto the mandrel 18. After the parallel filaments are wound about the mandrel to form the desired coil size, a transparent adhesive or resinous overcoating is applied to the coil to form a continuous integral helical member.

Next, the coil is longitudinally cut and removed from the mandrel to form a conductor panel. The inner surface of the panel is uncoated and eliminates the step of removing the insulation, as shown for the coil 22 in FIGURE 4. As shown for the panel 24 in FIGURE 6, the end connections to the panel 26 can be made by arranging the ends of the filaments in any desired pattern. In this manner, when the panels are used in an electroluminescent coordinate panel, a plot of a point on the panel screen can be made by applying an A.C. potential to an appropriate $x$ and $y$ conductor.

Accordingly, the present invention comprises a method and apparatus for obtaining a conductor panel having high resolution, either with an insulated metal filament, or with a glass filament coated with a transparent conductive material. The method of fabrication provides a resolution in the order of magnitude appreciably better than anything commercially available at the present time. Also, the method is economical and results in a rapid method of assembly.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention as set forth in the appended claim.

What is claimed is:

A method of fabricating a coordinate panel having a high packing density of between about 200 to about 1,000 lines per inch, which comprises the steps of feeding an insulated metal filament having adhesive bonding coating from a supply spool through a tensioning device onto a mandrel; softening with alcohol the adhesive bonding coating and allowing the softened adhesive bonding to harden to provide a continuous integral helical coil, removing a portion of the insulation from the integral helical coil to expose the metal for a predetermined portion of the filament diameter; longitudinally cutting the coil to obtain an integral conductor panel; separating in a predetermined pattern the filaments at one end of the panel to provide a connecting means; cementing the panel to an appropriate insulating substrate with the conductive surface exposed; applying to the exposed conductive surface a suitable dielectric as a thin film with phosphorus dispersed therein; forming a second integral conductor panel by repeating the steps required to form said first integral conductor panel; and using said first panel as an $x$ coordinate and superimposing said second panel on said first panel over said thin film in the $y$ direction as a $y$ coordinate.

References Cited in the file of this patent

UNITED STATES PATENTS

| | | |
|---|---|---|
| 2,684,450 | Mager et al. | July 20, 1954 |
| 2,909,599 | Berkley | Oct. 20, 1959 |
| 2,918,594 | Fridrich | Dec. 22, 1959 |
| 2,947,912 | Hoffman | Aug. 2, 1960 |